United States Patent
Peterson et al.

(10) Patent No.: US 7,181,421 B2
(45) Date of Patent: Feb. 20, 2007

(54) METHOD AND SYSTEM FOR TRACKING COMPUTER SYSTEM USAGE THROUGH A REMOTE ACCESS SECURITY DEVICE

(75) Inventors: Bruce Lee Peterson, Crystal Lake, IL (US); Christina Ellen Clayton, Chicago, IL (US); Michael Stephan Farmer, Wildwood, MO (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 11/267,245

(22) Filed: Nov. 4, 2005

(65) Prior Publication Data

US 2006/0059057 A1 Mar. 16, 2006

Related U.S. Application Data

(63) Continuation of application No. 10/024,734, filed on Dec. 18, 2001, now Pat. No. 7,020,628, which is a continuation of application No. 09/008,344, filed on Jan. 16, 1998, now Pat. No. 6,349,289.

(51) Int. Cl.
*G06F 15/00* (2006.01)
*G06F 15/02* (2006.01)

(52) U.S. Cl. .............................. 705/32; 705/31; 705/34

(58) Field of Classification Search ................. 705/30, 705/32, 34
See application file for complete search history.

(56) References Cited

U.S. PATENT DOCUMENTS

| | | | |
|---|---|---|---|
| 3,798,605 A | 3/1974 | Feistel | |
| 4,484,306 A * | 11/1984 | Kulczyckyj et al. | 726/3 |
| 4,672,572 A | 6/1987 | Alsberg | |
| 4,757,267 A | 7/1988 | Riskin | |
| 4,776,004 A | 10/1988 | Bauer et al. | |
| 4,800,590 A | 1/1989 | Vaughan | |
| 4,944,007 A | 7/1990 | Austin | |
| 5,003,584 A | 3/1991 | Benyacar et al. | |
| 5,068,894 A | 11/1991 | Hoppe | |
| 5,113,499 A | 5/1992 | Ankney et al. | |
| 5,115,466 A | 5/1992 | Presttum | |

(Continued)

FOREIGN PATENT DOCUMENTS

EP 558326 A1 9/1993

(Continued)

OTHER PUBLICATIONS

Hewlett-Packard, Accounting System Planning and Billing, Aug. 1992, 1-4.

*Primary Examiner*—Cuong Nguyen
(74) *Attorney, Agent, or Firm*—Brinks Hofer Gilson & Lione

(57) ABSTRACT

A system and method for monitoring remote computer access and associated costs is provided. The system includes a remotely located communication server in communication with multiple host computer networks and in communication with a network access server. First and second memory devices contain a list of authorized users for the host computer networks and a user log for use by a billing computer to generate bills. The method includes the steps of creating starting and ending time stamps for each authorized user accessing a respective one of the multiple host computer networks and creating a user log to generate bills and monitor host computer network usage.

12 Claims, 2 Drawing Sheets

U.S. PATENT DOCUMENTS

| | | | |
|---|---|---|---|
| 5,120,939 A | 6/1992 | Claus et al. | |
| 5,196,840 A | 3/1993 | Leith et al. | |
| 5,216,703 A | 6/1993 | Roy | |
| 5,276,444 A | 1/1994 | McNair | |
| 5,291,551 A | 3/1994 | Conn et al. | |
| 5,317,636 A | 5/1994 | Vizcaino | |
| 5,361,062 A | 11/1994 | Weiss et al. | |
| 5,392,345 A | 2/1995 | Otto | |
| 5,412,723 A | 5/1995 | Canetti et al. | |
| 5,481,613 A | 1/1996 | Ford et al. | |
| 5,493,492 A | 2/1996 | Cramer et al. | |
| 5,502,576 A * | 3/1996 | Ramsay et al. | 358/444 |
| 5,508,817 A | 4/1996 | Kunigami | |
| 5,534,857 A | 7/1996 | Laing et al. | |
| 5,535,276 A | 7/1996 | Ganesan | |
| 5,546,379 A | 8/1996 | Thaweethai et al. | |
| 5,553,239 A | 9/1996 | Heath et al. | |
| 5,560,008 A | 9/1996 | Johnson et al. | |
| 5,561,282 A * | 10/1996 | Price et al. | 235/380 |
| 5,586,175 A * | 12/1996 | Hogan et al. | 379/114.14 |
| 5,586,260 A | 12/1996 | Hu | |
| 5,590,181 A * | 12/1996 | Hogan et al. | 379/114.14 |
| 5,606,617 A | 2/1997 | Brands | |
| 5,615,251 A * | 3/1997 | Hogan et al. | 379/114.14 |
| 5,633,919 A * | 5/1997 | Hogan et al. | 379/115.01 |
| 5,638,430 A * | 6/1997 | Hogan et al. | 379/114.14 |
| 5,646,998 A * | 7/1997 | Stambler | 705/76 |
| 5,661,807 A | 8/1997 | Guski et al. | |
| 5,696,906 A | 12/1997 | Peters et al. | |
| 5,740,361 A | 4/1998 | Brown | |
| 5,742,905 A | 4/1998 | Pepe et al. | |
| 5,778,071 A | 7/1998 | Caputo et al. | |
| 5,790,548 A | 8/1998 | Sistanizadeh et al. | |
| 5,799,156 A * | 8/1998 | Hogan et al. | 709/237 |
| 5,802,502 A | 9/1998 | Gell et al. | |
| 5,854,833 A * | 12/1998 | Hogan et al. | 379/114.14 |
| 5,862,203 A | 1/1999 | Wulkan et al. | |
| 5,867,494 A | 2/1999 | Krishnaswamy et al. | |
| 5,867,495 A | 2/1999 | Elliott et al. | |
| 5,867,566 A * | 2/1999 | Hogan et al. | 379/115.01 |
| 5,873,099 A * | 2/1999 | Hogan et al. | 707/204 |
| 5,887,065 A | 3/1999 | Audebert | |
| 5,893,077 A | 4/1999 | Griffin | |
| 5,901,228 A * | 5/1999 | Crawford | 705/34 |
| 5,907,610 A | 5/1999 | Onweller | |
| 5,953,389 A * | 9/1999 | Pruett et al. | 379/9 |
| 6,016,343 A * | 1/2000 | Hogan et al. | 379/242 |
| 6,119,109 A * | 9/2000 | Muratani et al. | 705/400 |
| 6,272,341 B1 | 8/2001 | Threadgill et al. | |
| 6,279,038 B1 | 8/2001 | Hogan et al. | |
| 6,338,046 B1 | 1/2002 | Saari et al. | |
| 6,349,289 B1 * | 2/2002 | Peterson et al. | 705/34 |
| 6,504,907 B1 * | 1/2003 | Farris et al. | 379/35 |
| 6,533,108 B1 * | 3/2003 | Ledingham | 198/841 |
| 6,654,451 B1 * | 11/2003 | Ward | 379/114.24 |
| 2004/0019683 A1 | 1/2004 | Lee et al. | |

FOREIGN PATENT DOCUMENTS

| | | | |
|---|---|---|---|
| FI | 2000FI-20000761 | * | 3/2000 |
| GB | 2271696 B | | 4/1996 |
| JP | 05118861 | | 5/1993 |
| JP | 8-076295 | | 3/1996 |
| JP | 09327959 A | | 12/1997 |
| WO | WO 8302343 A | | 7/1993 |
| WO | WO 9937055 | | 7/1999 |
| WO | WO 9946691 A | | 9/1999 |

\* cited by examiner

METHOD AND SYSTEM FOR TRACKING COMPUTER SYSTEM USAGE THROUGH A REMOTE ACCESS SECURITY DEVICE

RELATED APPLICATIONS

This application is a continuation of U.S. application Ser. No. 10/024,734, filed Dec. 18, 2001 now U.S. Pat. No. 7,020,628, which is as continuation of U.S. application Ser. No. 09/008,344, filed Jan. 16, 1998, now U.S. Pat. No. 6,349,289, and the entirety of each of these applications is incorporated herein by reference.

BACKGROUND OF THE INVENTION

The present invention relates to a system and method for monitoring access to each of a plurality of unrelated host computer networks. More particularly, the present invention relates to a system and method of tracking computer usage, and costs associated with the computer usage, by authorized users of different computer networks.

Many organizations, both in government and in private industry, rely on access to centralized computer facilities. Use of remote access capabilities to centralized computer facilities is generally desirable in order to facilitate use of computer resources and improve productivity. Remotely located individuals who are, for example, traveling on business, often need to access their organization's computer. A concern of many organizations is monitoring the costs of remote users accessing the host computer or computer network of the company, in addition to tracking the usage of computer time and various costs associated with that time.

Typically, each organization's computer facility tracks computer usage internally and generates various reports based on that information. Also, the costs associated with remotely dialing up an organization's computer facilities, such as the telephone line charges, are reported separately by each of the one or more long distance line carriers utilized by the remotely located computer users. Additional costs of maintaining a remotely accessible computer network, such as supporting an information services person or department to handle difficulties with remote access by authorized users, may take up significant resources particularly in smaller organizations.

DETAILED DESCRIPTION OF THE PRESENTLY PREFERRED EMBODIMENTS

An advantage of the present invention is consolidation of usage and billing information in a single report. Another advantage of the present invention is the ability to manipulate the usage and billing data for each of a number of different host computer networks by individual user and by predetermined groups or departments of users at each organization. The preferred method and system cooperate with a system for securing access between remotely located computer users and the computers of different organizations for which they are permitted access.

Figure 1:
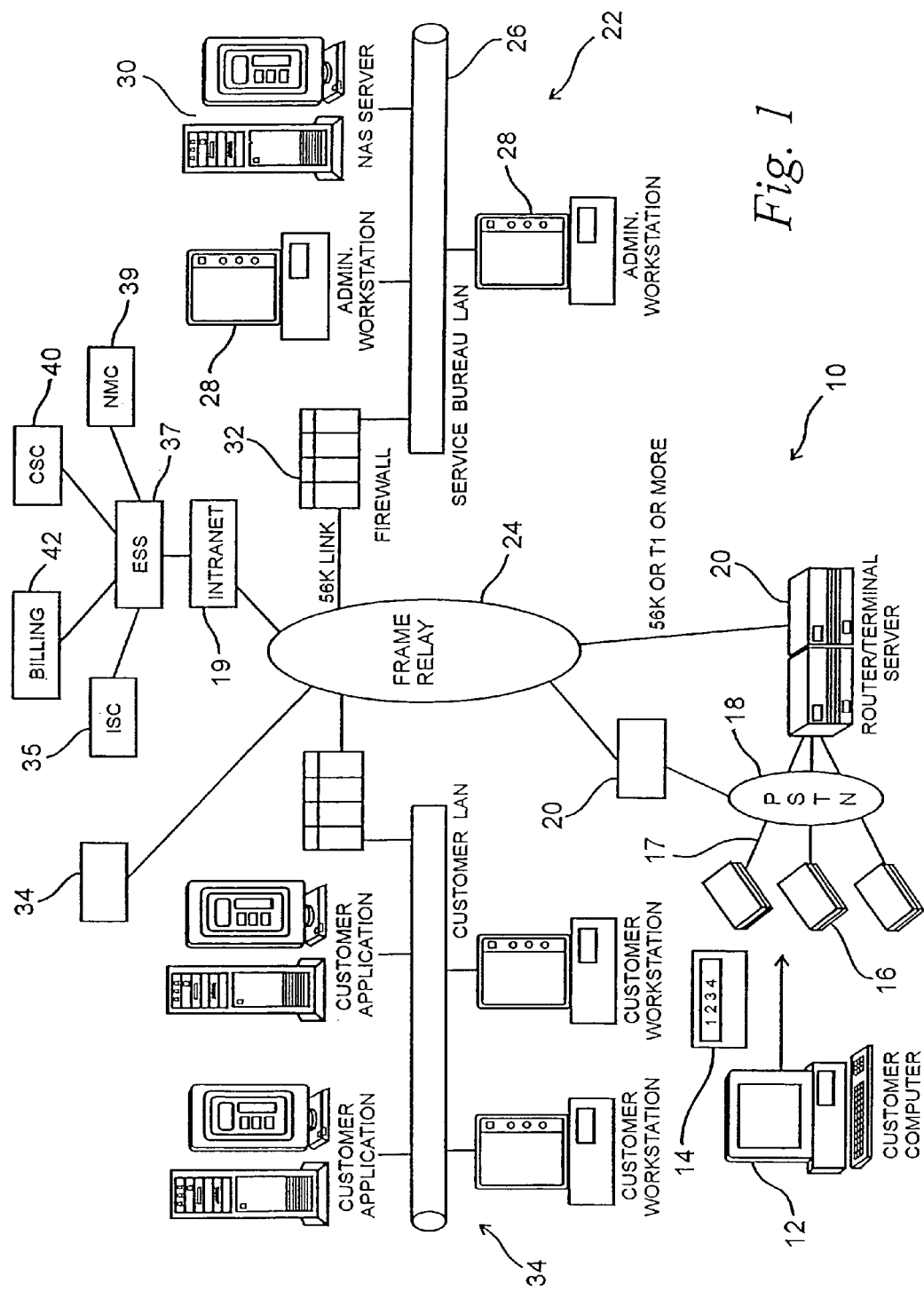
FIG. 1 illustrates a preferred embodiment of a system for monitoring computer usage and costs associated with remote access according to the present invention.

FIG. 1 illustrates a preferred system 10 for securing access between remotely located computer users and computers of different organizations in addition to monitoring access and maintaining billing records for each host computer system. The system 10 includes at least one remotely located user computer 12. A secure identification card 14 is associated with the user and the user computer 12. A user computer 12 preferably communicates over standard telephone lines, also known as plain old telephone service (POTS) lines 17, via modem 16 through the public switched telephone network (PSTN) 18. The system 10 of the present invention may use other commonly available communication devices, such as an ISDN terminal adapter or a communications server, in place of the analog modem. The user computer may be a personal computer or another computer network. One suitable secure ID card is available from Security Dynamics, Inc. of Cambridge, Mass. and includes a display showing a time variant pass code for use by an authorized user in accessing a host computer network.

A communications server 20, which may be a router such as a Cisco 5200, is in communication with a security service bureau 22 over a frame relay network 18. The security service bureau 22 may be a local area network (LAN) 26 that includes at least one administrative workstation 28 for monitoring operation of the security service bureau 22. A suitable administrative workstation 28 may be any of a number of commonly available personal computers. A network access server (NAS) 30 is also connected to the LAN 26. The LAN 26 of the service bureau 22 connects to the frame relay network 24 via a firewall 32. The firewall may be a personal computer, such as those available from SUN Microsystems, running software available from SOLARIS to provide protection to the service bureau LAN 26 from outside corruption. The NAS 30 may be any of a number of servers available from Hewlett Packard, such as the HP712, HP755, or the HP720. The NAS 30 of the service bureau 22 controls access of remote users, through the communication server 20 and frame relay network 24, to the multiple host computer networks 34 or stand alone computers. In the example of FIG. 1, each of the host computer networks or stand alone computers utilize the service bureau to authenticate remote users at various computers 12. One system and method for authenticating users through a service bureau is disclosed in a commonly assigned U.S. application Ser. No. 09/008,527, filed Jan. 16, 1998, and is hereby incorporated by reference in its entirety.

The system 10 also includes an integrated service center (ISC) 35 and an enterprise service system (ESS) 37. The ISC 35 preferably includes a computer configured to accept all service requests from various end user host computer networks desiring to add or remove computer use monitoring services or change the list of authorized users for the network. Additionally, the ISC 35 receives telephone calls from end users 12 seeking help relating to remote access services. The ISC 35 assigns help requests to the appropriate party in the system 10. In one embodiment, the ISC 35 is a vertically integrated service center and help desk for video, audio, and data communications.

The ESS 37 is a master database containing lists of periodic user charges, also known as "per seat" charges, for the various host computer systems serviced by the system 10. The ESS 37 also contains a list of field service fees associated with a respective host computer network 34 and records any extra services used by a host computer network 34 and its authorized users. The fees for each particular host computer network are negotiated prior to beginning services to a particular host computer network and associated authorized users. The negotiated fees may be stored as tables in the ESS. The ESS 37 may be a server running UNIX software such as a SPARC Server available from SUN Microsystems. The ESS receives updates on authorized users and subscribing host computer networks from the ISC.

A network management center (NMC) 39 is in communication with the ISC 35 and a private corporate intranet 19 via the ESS 37. The NMC 39 receives help requests from the ISC and provides a help desk for network infrastructure problems, performance issues and chronic desktop problems. The NMC 39 uses a pre-entered user definition and information to create a trouble record for resolving issues associated with remote access services provided to the host computer networks 34. Each trouble call is stored at the NMC 39. The NMC serves to provide proactive surveillance of all physical lines and communications servers in the system as well as handling trouble calls passed on from the ISC.

A customer service center (CSC) 40 is also linked to the system 10 via the ESS and the private corporate intranet 19. The CSC 40 manages the ordering of POTS services and repairs of business lines (e.g. DS1, ISDN, etc.). A billing application communicates over the corporate intranet 19, via the ESS 37, with the NAS 30 and other system 10 components to obtain necessary billing information concerning host computer networks 34 and their respective users. Preferably, the billing application is a software application running within the ESS containing logic necessary to organize cost data by per user and per entity within a particular client's (host computers) organization. Alternatively, the billing application may be a discrete billing computer 42 executing the necessary logic to obtain and manipulate billing information.

Figure 2:
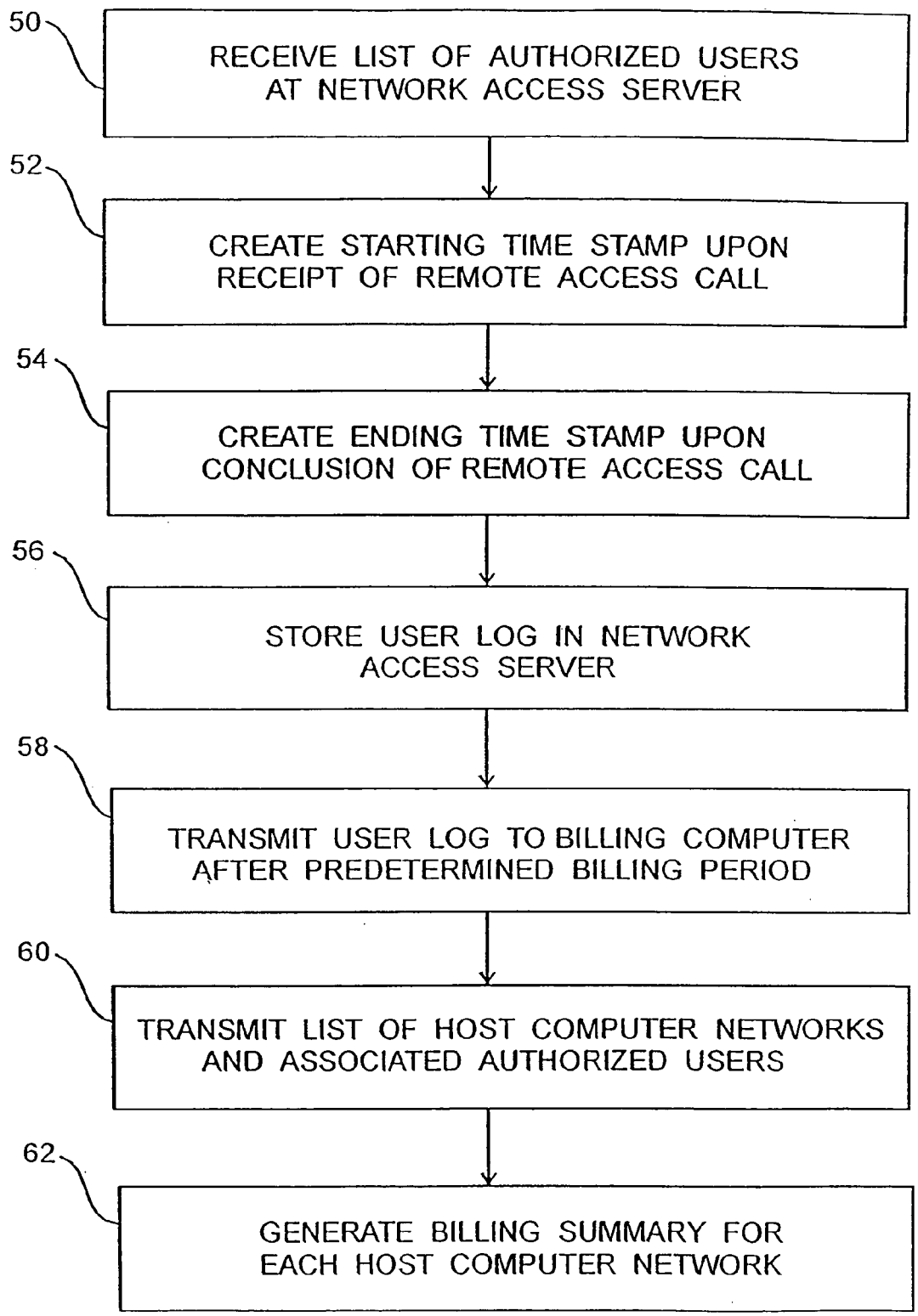
FIG. 2 is a flow chart showing a preferred method of monitoring computer usage and costs using the system of FIG. 1.

Utilizing the system 10 described above, a preferred method of monitoring access to each of the host computer networks subscribing to the system security services is illustrated in FIG. 2. Each computer network 34 provides an associated list of authorized users that is maintained at the ISC, ESS, and NAS 30 (at step 50). An authorized user accessing a host computer exchanges the information with the NAS 30, via the communication server, each time the user dials in to gain access to his respective host computer network 34. A starting time stamp is created at the beginning of each remote access call received from a user at the communication server 20 (at step 52). In a preferred embodiment, the remote user accesses his respective host computer network by dialing in through the PSTN 18 using a modem 16 or other communication device to reach a network communications server 20. The communication server 20 forwards information on the call through the frame relay network 24 to the service bureau 22. At the service bureau 22, the NAS 30 authenticates the user through the exchange of a user name and a pass code.

The pass code preferably consists of a fixed personal identification number and a time variable security token. The security token may be a soft token, such as a software application on each authorized user's computer, or a hard token, such as a secure ID card 14 available from Security Dynamics, Inc. Each authorized user preferably has her own security token and the security token may be a sequence of numbers, letters, or other type of symbol. Using the secure ID card 14, the security token is obtained by the user from a display that generates a new security token at predetermined time increments. The NAS 30, containing an identical security token generating algorithm synchronized with the secure ID card 14 generates the same security token to verify that the user is an authorized user. On authentication, the communication server 20 connects the user computer 12 to the appropriate host computer 34 for the duration of the call. The NAS 30 receives an ending time stamp from the communication server 20 at the conclusion of the remote access call when the user hangs up or otherwise disconnects from the host computer network 34 (at step 54). Following the conclusion of the remote access call, the service bureau stores the starting and ending time stamps in the NAS memory. Preferably the starting and ending time stamps are associated in the user log with the list of authorized users so that the user log contains a record of computer time usage for each authorized user (at step 56).

After the end of the predetermined billing period, the user log is transmitted from the service bureau in a discrete file generated at the NAS to the billing computer 42 (at step 58). The billing period may be any desired length of time, such as a month or a year. The list of host computer networks and associated list of authorized users for a host computer network is also transmitted to the billing computer (at step 60) from the NAS over the frame relay network. The billing computer then generates a billing summary for each of the subscribing customer host computer networks (at step 62).

As part of the process of developing a periodic bill for customers subscribing to the system, a long distance carrier invoice is electronically transmitted to the billing computer from a long distance telephone service provider. The long distance service provider may be any one of a number of available service providers, such as Ameritech, selected by the host computer network. The long distance telephone service provider transmits a minutes of use invoice for the long distance access number used by authorized users of a given host computer network to access the security service bureau. The long distance access number may be an "800" number or other telephone number dedicated for use by authorized users to communicate with the appropriate host computer through the system 10.

Because each authorized user of a given host computer network is provided with the same telephone number, the billing computer can use the unique pass code each user possesses to distribute the minutes of use charge to the appropriate. Preferably, the long distance charges are distributed appropriately among the users of each host computer network based on a user's percentage of computer access time for that billing period. The ESS 39 provides fixed expense information to the billing computer 42 by way of monthly per seat charges and incident charges. Incident charges refer to the fees assessed to calls by authorized users to the system help desk at the CSC.

Using all the information gathered, the billing computer based on the subscribed for services and the usage of each individual authorized user, various usage information and billing forms will be created. For example, in one preferred embodiment a bill may be generated that breaks up authorized users into the various departments to which they are assigned within a customer's organization. For each authorized user in the department a predetermined group of information may be displayed. This information may include per seat charges, the cost of long distance telephone usage (distributed among authorized users based on the amount of time a user was communicating with the host computer network), any equipment charges, maintenance charges, and miscellaneous charges. The per seat charges refer to fixed service charges associated with supporting each authorized user. The miscellaneous costs may include incidental security cost such as replacing secure ID cards, or for particular pieces of software necessary for enabling remote users to access their host network through the security service bureau 22. Optionally included in the per seat charges are the local exchange and other incidental charges. Once the billing summary has been generated, the billing computer can transmit the billing summary directly to the appropriate host computer network. The transmission may be done via e-mail over an internet connection, via facsimile, or through other means.

Another aspect of the presently preferred invention is that computer usage information may be provided to the customer and the service provider maintaining the security service bureau 22 so that computer resources may be optimized for usage patterns. For example, the billing computer may generate monthly or annual reports dividing up the usage for each individual authorized user by total time used per a given period or by time of day or week so that host computer network 34 or service bureau 22 resources can be properly allocated for particularly heavy usage.

From the above, a new system and method of monitoring access and fees for host computer networks with relocated users is provided. The method includes maintaining a list of host computer networks and associated list of authorized users for each network, creating a starting and ending time stamp for remote access calls, transmitting the starting and ending time stamps in the user log to a billing computer in addition to other billing information, and generating a billing summary of costs and usage at the billing computer. The system preferably includes a security service bureau providing secure remote access between remotely located authorized users and their respective proprietary host networks. In one preferred embodiment, the NAS preferably records time stamps and a user log indicating usage of resources by individual authorized users. A billing computer is also included in the system having the logic necessary to compile information from the user log in the security service bureau and cost information received from outside sources to generate a periodic bill indicating cost per individual user and/or department.

It is intended that the foregoing detailed description be regarded as illustrative rather than limiting, and that it be understood that the following claims, including all equivalents, are intended to define the scope of this invention.

We claim:

1. In a system for providing secure remote access between a plurality of unrelated host computer networks and a plurality of authorized users via a network access server, a method of monitoring access to each of the unrelated host computer networks comprising the steps of:

receiving at a communication server a request from a remotely located computer user to access one of the plurality of unrelated host computer networks;

automatically transmitting information regarding the request from the communication server to the network access server, the information comprising identification information for the remotely located computer user;

determining at the network access server if the user is authorized to access the one of the plurality of unrelated host computer networks;

establishing a connection between the remotely located computer user and the one of the plurality of unrelated host computer networks via the communication server if the remotely located user is an authorized remotely located user for the one of the plurality of unrelated host computer networks;

storing computer usage time for the authorized remotely located computer user in a user log at the network access server after the authorized remotely located computer user disconnects from the one of the plurality of unrelated host computer networks whereby the user log contains a record of computer time usage for each authorized user;

for each of the plurality of unrelated host computer networks, generating a billing and computer time usage summary, each billing and computer time usage summary listing charges and computer time usage for a respective one of the plurality of unrelated host computer networks; and electronically transmitting each billing and computer usage summary to an appropriate one of the plurality of unrelated host computer networks.

2. The method of claim 1, wherein generating a billing and computer time usage summary further comprises generating a list of fixed charges and generating a list of help desk charges for each of the unrelated host computer networks.

3. The method of claim 1, wherein generating a billing and computer time usage summary further comprises receiving a long distance telephone company report containing charges associated with each of the respective unrelated host computer networks.

4. The method of claim 3, further comprising listing, in the billing and computer time usage summary for a particular unrelated host computer network, charges from the long distance company report for each remotely located computer user of the particular unrelated host computer network.

5. The method of claim 4, wherein listing charges from the long distance company report comprises calculating a percentage of computer use time attributable to each of the remotely located computer users for the particular host computer network and distributing the charges from the long distance company report to appropriate remotely located computer users in the billing summary for the particular host computer network according to the calculated percentage of computer use time.

6. The method of claim 1, wherein storing computer usage time for the authorized remotely located computer user comprises recording starting and ending time stamps for a remote access call to the one of the plurality of unrelated host computer networks in the user log.

7. A system for providing secure remote access between a plurality of unrelated host computer networks and a plurality of authorized users, the system comprising:

a first processor configured for communication with the plurality of unrelated host computer networks;

first processor logic executable by the first processor comprising instructions for executing the following steps:

in response to receipt of identification information for a remotely located user seeking to access one of the plurality of unrelated computer networks, determining if the remotely located user is authorized to access the one of the plurality of unrelated host computer networks;

establishing a connection between the remotely located computer user and the one of the plurality of unrelated host computer networks via a communication device if the remotely located user is an authorized remotely located user for the one of the plurality of unrelated host computer networks; and storing computer usage time for the authorized remotely located computer user in a user log after the authorized remotely located computer user disconnects from the one of the plurality of unrelated host computer networks whereby the user log contains a record of computer time usage for each authorized user;

a second processor in communication with the first processor; and second processor logic executable by the second processor comprising instructions for executing the following steps:

generating a billing and computer time usage summary for each of the plurality of unrelated host computer networks, each billing and computer time usage summary listing charges and computer time usage for a respective one of the plurality of unrelated host computer networks;

and electronically transmitting each billing and computer usage summary to an appropriate one of the plurality of unrelated host computer networks.

8. The system of claim 7, wherein the instructions for executing the steps of generating a billing and computer time usage summary further comprise instructions for generating a list of fixed charges and generating a list of help desk charges for each of the unrelated host computer networks.

9. The system of claim 7, wherein the instructions for executing the steps of generating a billing and computer time usage summary further comprise instructions for receiving a long distance telephone company report containing charges associated with each of the respective unrelated host computer networks.

10. The system of claim 9, wherein the instructions for executing the steps of generating a billing and computer time usage summary further comprises instructions for listing, in the billing and computer time usage summary for a particular unrelated host computer network, charges from the long distance company report for each remotely located computer user of the particular unrelated host computer network.

11. The system of claim 10, wherein the instructions for listing charges from the long distance company report comprise instructions for calculating a percentage of computer use time attributable to each of a plurality of remotely located computer users for the particular host computer network and for distributing the charges from the long distance company report to appropriate remotely located computer users in the billing summary for the particular host computer network according to the calculated percentage of computer use time.

12. The system of claim 7, wherein the instructions for storing computer usage time for the authorized remotely located computer user comprise instructions for recording starting and ending time stamps for a remote access call to the one of the plurality of unrelated host computer networks in the user log.

* * * * *

UNITED STATES PATENT AND TRADEMARK OFFICE
CERTIFICATE OF CORRECTION

PATENT NO. : 7,181,421 B2
APPLICATION NO. : 11/267245
DATED : February 20, 2007
INVENTOR(S) : Bruce Lee Peterson et al.

It is certified that error appears in the above-identified patent and that said Letters Patent is hereby corrected as shown below:

In the Claims

Column 6, line 9; in claim 1, line 34, after "networks; and" start a new paragraph with the "electronically transmitting each".

Column 7, line 8; in claim 7, line 37, after "networks;" insert --and--.

Column 7, line 9; in claim 7, line 38, before "electronically transmitting each" delete "and".

Signed and Sealed this

Fifth Day of June, 2007

JON W. DUDAS
*Director of the United States Patent and Trademark Office*